(12) United States Patent
Zeng et al.

(10) Patent No.: US 11,506,869 B2
(45) Date of Patent: Nov. 22, 2022

(54) MINIATURE IMAGING LENS FOR CLOSE-RANGE IMAGING

(71) Applicants: CONVERGENCE TECHNOLOGY CO., LTD., Wuhan (CN); HUAZHONG UNIVERSITY OF SCIENCE AND TECHNOLOGY, Wuhan (CN)

(72) Inventors: Shaoqun Zeng, Wuhan (CN); Qinglei Hu, Wuhan (CN); Kai Huang, Wuhan (CN); Ning Li, Wuhan (CN); Mengting Li, Wuhan (CN)

(73) Assignees: CONVERGENCE TECHNOLOGY CO., LTD., Wuhan (CN); HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 17/753,436

(22) PCT Filed: Sep. 2, 2019

(86) PCT No.: PCT/CN2019/103999
§ 371 (c)(1),
(2) Date: Mar. 3, 2022

(87) PCT Pub. No.: WO2021/007930
PCT Pub. Date: Jan. 21, 2021

(65) Prior Publication Data
US 2022/0269046 A1    Aug. 25, 2022

(30) Foreign Application Priority Data
Jul. 18, 2019   (CN) .......................... 201910651974.9

(51) Int. Cl.
*G02B 13/00*  (2006.01)
*G02B 13/24*  (2006.01)

(52) U.S. Cl.
CPC .......... *G02B 13/003* (2013.01); *G02B 13/24* (2013.01)

(58) Field of Classification Search
CPC .............................. G02B 13/003; G02B 13/24
See application file for complete search history.

(56) References Cited

U.S. PATENT DOCUMENTS

2022/0057601 A1 *   2/2022   Nakatsuji ............... G02B 13/04

FOREIGN PATENT DOCUMENTS

| CN | 101614866 A | 12/2009 |
|----|-------------|---------|
| CN | 103003734 A | 3/2013  |

(Continued)

*Primary Examiner* — James C. Jones
(74) *Attorney, Agent, or Firm* — Bayramoglu Law Offices LLC

(57) ABSTRACT

A miniature imaging lens for close-range imaging includes: a first lens group, an aperture, and a second lens group sequentially arranged in a direction from the object side to the image side of an optical axis; the first lens group and the second lens group have positive focal power, an object-side clear aperture of the first lens group is larger than an image-side clear aperture of the first lens group, and an object-side clear aperture of the second lens group is less than an image-side clear aperture of the second lens group, and specific process parameters are provided. A sandwich structure lens configuration composed of a first lens group, an aperture and a second lens group can obtain a high close-range imaging effect under the condition of miniaturization, and can effectively reduce aberrations of close-range imaging, especially distortion and chromatic aberration.

21 Claims, 14 Drawing Sheets

(56) References Cited

FOREIGN PATENT DOCUMENTS

| | | | |
|---|---|---|---|
| CN | 106483639 | A | 3/2017 |
| CN | 106886085 | A | 6/2017 |
| CN | 108008525 | A | 5/2018 |
| CN | 108732723 | A | 11/2018 |
| CN | 109407279 | A | 3/2019 |
| KR | 101429890 | B1 | 8/2014 |

\* cited by examiner

| No. of surface (s) | surface type | radius of curvature (r) | thickness (t) | material | refractive index (n) | abbe number (v) | cone coefficient (k) |
|---|---|---|---|---|---|---|---|
| object plane | | | 8.5000E-01 | | | | |
| 1 | aspherical | -5.7765E-01 | 3.0000E-01 | plastic | 1.5449E+00 | 5.5930E+01 | -6.7609E+00 |
| 2 | aspherical | 5.0893E+01 | 1.0000E-01 | | | | -1.0000E+00 |
| 3 | aspherical | 4.6776E-01 | 5.5000E-01 | plastic | 1.5449E+00 | 5.5930E+01 | -3.1908E+00 |
| 4 | aspherical | 2.2585E+00 | 1.8000E-01 | | | | 1.5229E+00 |
| 5 | aspherical | -1.0124E+01 | 2.3000E-01 | plastic | 1.6328E+00 | 2.3336E+01 | -1.0000E+00 |
| 6 | aspherical | 2.8398E+00 | 2.5000E-01 | | | | 8.8125E+00 |
| 7 | aspherical | 1.2218E+01 | 4.0000E-01 | plastic | 1.5449E+00 | 5.5930E+01 | -3.3004E+01 |
| 8 | aspherical | -1.2501E+00 | 1.0000E-01 | | | | -5.4873E-01 |
| aperture | | | 1.0000E-01 | | | | |
| 9 | aspherical | 1.9375E+00 | 7.5000E-01 | plastic | 1.5449E+00 | 5.5930E+01 | -1.0687E+01 |
| 10 | aspherical | -4.1830E+00 | 1.5000E-01 | | | | -1.9601E+01 |
| 11 | aspherical | -1.1136E+01 | 2.5000E-01 | plastic | 1.6328E+00 | 2.3336E+01 | -3.6017E+00 |
| 12 | aspherical | 2.7726E+00 | 2.6000E-01 | | | | -9.5971E+00 |
| 13 | aspherical | 5.0204E+00 | 3.9000E-01 | plastic | 1.6328E+00 | 2.3336E+01 | -1.7022E+00 |
| 14 | aspherical | 4.3435E+00 | 1.4000E-01 | | | | -1.0000E+00 |
| 15 | aspherical | 1.4769E+01 | 1.0600E+00 | plastic | 1.5449E+00 | 5.5930E+01 | -1.0000E+00 |
| 16 | aspherical | -8.4646E-01 | 2.2000E-01 | | | | -4.8726E+00 |
| 17 | aspherical | -3.8033E+00 | 2.5000E-01 | plastic | 1.5445E+00 | 5.6003E+01 | 1.1075E+00 |
| 18 | aspherical | 9.1159E-01 | 6.0000E-01 | | | | -8.5559E+00 |
| 19 | standard | Infinity | 2.0000E-01 | glass | 1.5168E+00 | 6.4167E+01 | |
| 20 | standard | Infinity | 3.4000E-01 | | | | |
| image plane | | | | | | | |

FIG. 8

| No. of surface(s) | A4 | A6 | A8 | A10 | A12 | A14 | A16 |
|---|---|---|---|---|---|---|---|
| object plane | | | | | | | |
| 1 | 3.3923E-01 | -3.3138E-01 | 3.2279E-01 | -2.2047E-01 | 9.3689E-02 | -2.0717E-02 | 0.0000E+00 |
| 2 | 1.6725E-01 | 4.4730E-02 | -2.8637E-01 | 1.6231E-01 | 2.2770E-03 | -2.3876E-02 | 0.0000E+00 |
| 3 | 5.9725E-01 | -1.2037E+00 | 9.5197E-01 | -9.5566E-01 | -1.5217E+00 | 1.4201E+00 | 9.3853E-01 |
| 4 | -1.6247E-01 | -3.9876E-01 | -1.7538E+00 | 1.3550E+00 | -2.7053E+01 | 1.5259E+01 | 3.8142E+00 |
| 5 | 1.4859E-02 | 6.8472E-01 | 1.2671E+00 | -6.2881E+00 | 3.7899E+00 | 0.0000E+00 | 0.0000E+00 |
| 6 | 5.1638E-01 | 2.0775E+00 | -1.5219E+00 | -9.1266E+00 | 1.6533E+00 | 0.0000E+00 | 0.0000E+00 |
| 7 | 3.4450E-01 | 1.2007E+00 | -1.7877E+00 | 5.4749E+00 | -5.0462E-02 | 5.7777E+00 | 0.0000E+00 |
| 8 | 3.8504E-02 | 7.6556E-01 | -3.8531E+00 | 1.4527E+01 | 2.8787E+00 | 5.3648E+00 | 0.0000E+00 |
| aperture | | | | | | | |
| 9 | 1.6537E-01 | -2.3603E-01 | 1.2326E-01 | -3.7999E-01 | -2.3259E-01 | 2.4766E+00 | 0.0000E+00 |
| 10 | -6.6213E-02 | -8.9015E-02 | 9.9351E-04 | 8.1227E-02 | -1.3914E-01 | -2.5545E-01 | 0.0000E+00 |
| 11 | -6.2606E-02 | -1.2984E-01 | 3.5594E-01 | -6.9611E-01 | 8.2543E-01 | -3.5715E-01 | 0.0000E+00 |
| 12 | -5.5682E-02 | -4.8497E-01 | 1.6673E-01 | -4.2276E-01 | 3.9362E-01 | -1.4829E-01 | 0.0000E+00 |
| 13 | -1.7315E-01 | -1.2384E-01 | 2.9367E-01 | -3.8930E-01 | 1.7089E-01 | -4.6101E-03 | 0.0000E+00 |
| 14 | -1.4836E-01 | -7.8556E-02 | 1.2937E-01 | -6.3504E-02 | 4.7843E-02 | -9.9579E-03 | 0.0000E+00 |
| 15 | -3.8961E-02 | 5.6352E-02 | -2.1371E-01 | 3.0139E-01 | -1.7306E-01 | 3.5563E-02 | 0.0000E+00 |
| 16 | -7.5675E-02 | 1.3933E-01 | -1.2960E-01 | 6.5307E-02 | -1.7106E-02 | 1.3870E-03 | 0.0000E+00 |
| 17 | -1.9223E-02 | -5.9819E-02 | 3.3706E-02 | -8.1535E-03 | -1.7692E-03 | 9.8144E-04 | 0.0000E+00 |
| 18 | -8.3941E-02 | 3.2121E-02 | -1.1039E-02 | 2.0770E-03 | -2.4130E-04 | 1.8353E-05 | 0.0000E+00 |
| 19 | | | | | | | |
| 20 | | | | | | | |
| image plane | | | | | | | |

FIG. 9

| No. of surface (s) | surface type | radius of curvature (r) | thickness (t) | material | refractive index (n) | abbe number (v) | cone coefficient (k) |
|---|---|---|---|---|---|---|---|
| object plane | standard | | 8.4937E-01 | | | | |
| 1 | aspherical | -5.7800E-01 | 3.0000E-01 | plastic | 1.5449E+00 | 5.5930E+01 | -6.7943E+00 |
| 2 | aspherical | 5.1937E+01 | 1.0000E-01 | | | | -1.0000E+00 |
| 3 | aspherical | 4.6766E-01 | 5.5000E-01 | plastic | 1.5449E+00 | 5.5930E+01 | -3.1946E+00 |
| 4 | aspherical | 2.2576E+00 | 1.8000E-01 | | | | 1.5231E+00 |
| 5 | aspherical | -1.0107E+01 | 2.3000E-01 | plastic | 1.6327E+00 | 2.3255E+01 | -1.0000E+00 |
| 6 | aspherical | 2.8386E+00 | 2.5000E-01 | | | | 8.8165E+00 |
| 7 | aspherical | 1.2246E+01 | 4.0000E-01 | plastic | 1.5445E+00 | 5.6003E+01 | -3.3139E+01 |
| 8 | aspherical | -1.2501E+00 | 1.0000E-01 | | | | -5.4919E-01 |
| aperture | standard | | 1.0000E-01 | | | | |
| 9 | aspherical | 2.0124E+00 | 4.2900E-01 | plastic | 1.5449E+00 | 5.5930E+01 | -2.5968E+00 |
| 10 | aspherical | -5.4025E+00 | 4.0000E-01 | | | | -6.0669E+01 |
| 11 | aspherical | -4.3699E+00 | 2.3500E-01 | plastic | 1.6328E+00 | 2.3336E+01 | 9.9977E-01 |
| 12 | aspherical | 3.0178E+00 | 1.2200E-01 | | | | -9.0000E+01 |
| 13 | aspherical | -1.8591E+00 | 5.7600E-01 | plastic | 1.5449E+00 | 5.5930E+01 | 4.1262E+00 |
| 14 | aspherical | -5.8027E-01 | 3.0000E-02 | | | | -3.9914E+00 |
| 15 | aspherical | 8.9213E-01 | 3.0000E-01 | plastic | 1.5445E+00 | 5.5987E+01 | -5.9548E+00 |
| 16 | aspherical | 4.7451E-01 | 1.2059E+00 | | | | -3.8363E+00 |
| image plane | standard | | | | | | |

FIG. 10

| No. of surfaces | A4 | A6 | A8 | A10 | A12 | A14 | A16 |
|---|---|---|---|---|---|---|---|
| object plane | | | | | | | |
| 1 | 3.3725E-01 | -3.3147E-01 | 3.2291E-01 | -2.2035E-01 | 9.3787E-02 | -2.0636E-02 | 0.0000E+00 |
| 2 | 1.6756E-01 | 4.4715E-02 | -2.8866E-01 | 1.6202E-01 | 2.2762E-03 | -2.3884E-02 | 0.0000E+00 |
| 3 | 5.9717E-01 | -1.2035E+00 | 9.5260E-01 | -9.5444E-01 | -1.5194E+00 | 1.4237E+00 | 9.4448E-01 |
| 4 | -1.6238E-01 | -3.9922E-01 | -1.7549E+00 | 1.3547E+01 | -2.7055E+01 | 1.5250E+01 | 3.8154E+00 |
| 5 | 1.4822E-02 | 6.8533E-01 | 1.2689E+00 | -6.2840E+00 | 3.7986E+00 | 0.0000E+00 | 0.0000E+00 |
| 6 | 5.1652E-01 | 2.0766E+00 | -1.5211E+00 | -9.1272E+00 | 1.6542E+00 | 0.0000E+00 | 0.0000E+00 |
| 7 | 3.4464E-01 | 1.2012E+00 | -1.7880E+00 | 5.4650E+00 | -5.0543E-02 | 5.2754E+00 | 0.0000E+00 |
| 8 | 3.8535E-02 | 7.6784E-01 | -3.8396E-01 | 1.4561E+01 | 3.0167E+00 | 5.4270E+00 | 0.0000E+00 |
| aperture | | | | | | | |
| 9 | -1.0174E-01 | -3.9279E-01 | 4.4585E-01 | -1.7980E+00 | 0.0000E+00 | 0.0000E+00 | 0.0000E+00 |
| 10 | -4.4668E-01 | 1.0517E-01 | -1.1533E+00 | 1.8683E+00 | 0.0000E+00 | 0.0000E+00 | 0.0000E+00 |
| 11 | -9.9063E-01 | 1.8882E-01 | 4.8742E-01 | -2.3661E-01 | 3.4745E+00 | 0.0000E+00 | 0.0000E+00 |
| 12 | -3.0189E-01 | -1.1320E-01 | 1.7669E-01 | 0.0000E+00 | 0.0000E+00 | 0.0000E+00 | 0.0000E+00 |
| 13 | 7.8129E-01 | -3.8451E+00 | 1.8723E+01 | -6.3836E+01 | 1.3404E+02 | -1.4872E+02 | 6.7749E+01 |
| 14 | -8.4204E-01 | 1.7270E+00 | -2.1358E-01 | -4.1578E-01 | 4.6629E+00 | -2.7804E+00 | -3.4585E-01 |
| 15 | -1.5655E-01 | 1.2611E-01 | -1.2951E-01 | 1.3624E-01 | -8.4195E-02 | 2.4983E-02 | -2.7169E-03 |
| 16 | -2.0574E-01 | 1.8765E-01 | -1.4970E-01 | 7.6445E-02 | -1.9261E-02 | 3.4736E-04 | 4.8995E-04 |
| image plane | | | | | | | |

FIG. 11

| No. of surface (s) | surface type | radius of curvature (r) | thickness (t) | material | refractive index (n) | abbe number (v) | cone coefficient (k) |
|---|---|---|---|---|---|---|---|
| object plane | | | 5.0699E-01 | | | | |
| 1 | aspherical | -1.3651E+00 | 3.2800E-01 | plastic | 1.5400E+00 | 5.5900E+01 | -1.1231E+00 |
| 2 | aspherical | -1.7882E+00 | 5.0000E-02 | | | | -1.1609E+00 |
| 3 | aspherical | 1.0392E+00 | 3.2000E-01 | plastic | 1.6300E+00 | 2.3400E+01 | -1.5891E+01 |
| 4 | aspherical | 2.6683E+00 | 2.2000E-01 | | | | -1.6363E+00 |
| 5 | aspherical | 1.3661E+00 | 4.3200E-01 | plastic | 1.5400E+00 | 5.5900E+01 | -4.4910E-02 |
| 6 | aspherical | -8.3950E-01 | 0.0000E+00 | | | | -2.6106E+01 |
| aperture | | | 1.0000E-01 | | | | 0.0000E+00 |
| 7 | aspherical | 5.1613E-01 | 7.5000E-01 | plastic | 1.5500E+00 | 7.4000E+01 | -1.0687E+01 |
| 8 | aspherical | -2.3906E-01 | 1.5000E-01 | | | | -1.9601E+01 |
| 9 | aspherical | -8.9802E-02 | 2.5000E-01 | plastic | 1.6300E+00 | 2.2000E+01 | -3.6017E+00 |
| 10 | aspherical | 3.6067E-01 | 2.6000E-01 | | | | -9.5971E+00 |
| 11 | aspherical | 1.9919E-01 | 3.9000E-01 | plastic | 1.5800E+00 | 1.4900E+01 | -1.7022E+00 |
| 12 | aspherical | 2.3023E-01 | 1.4000E-01 | | | | -1.0000E+00 |
| 13 | aspherical | 6.7711E-02 | 1.0600E+00 | plastic | 1.5500E+00 | 5.8400E+01 | -1.0000E+00 |
| 14 | aspherical | -1.1814E+00 | 2.2000E-01 | | | | -4.8725E+00 |
| 15 | aspherical | -2.6293E-01 | 2.5000E-01 | plastic | 1.5400E+00 | 7.6600E+01 | 1.1075E+00 |
| 16 | aspherical | 1.0970E+00 | 6.0000E-01 | | | | -8.5559E+00 |
| 17 | standard | Infinity | 2.0000E-01 | glass | 1.5400E+00 | 5.6000E+01 | 0.0000E+00 |
| 18 | standard | Infinity | 3.4253E-01 | | | | |
| image plane | | | | | | | |

FIG. 12

| No. of surface(s) | A4 | A6 | A8 | A10 | A12 | A14 | A16 |
|---|---|---|---|---|---|---|---|
| object plane | | | | | | | |
| 1 | 1.9056E+00 | -1.6860E+00 | -4.4432E+00 | 1.6003E+01 | -2.6724E+00 | 3.4280E-01 | 3.4280E-01 |
| 2 | 2.6420E+00 | -7.7131E-01 | 1.5830E+00 | -2.5193E+01 | 7.0438E+01 | 0.0000E+00 | 0.0000E+00 |
| 3 | 2.2688E-01 | -6.5055E+00 | 1.4931E+01 | -2.9487E+01 | 0.0000E+00 | 0.0000E+00 | 0.0000E+00 |
| 4 | -3.7465E+00 | 5.4121E+00 | -4.9645E+01 | 2.7654E+03 | -5.3582E+03 | 0.0000E+00 | 0.0000E+00 |
| 5 | 8.7008E-01 | 1.1126E+00 | 7.5009E+00 | -2.7558E+01 | 0.0000E+00 | 0.0000E+00 | 0.0000E+00 |
| 6 | -6.7091E-01 | 1.1378E-01 | -1.7074E+01 | 4.1494E+02 | 0.0000E+00 | 0.0000E+00 | 0.0000E+00 |
| aperture | | | | | | | |
| 7 | 1.6537E-01 | -2.3603E-01 | 1.2326E-01 | -3.7999E-01 | -2.3259E-01 | 2.4766E+00 | 2.4766E+00 |
| 8 | -6.6213E-02 | -8.9015E-02 | 9.9351E-04 | 8.1227E-04 | -1.3914E-02 | -2.5545E-01 | -2.5545E-01 |
| 9 | -6.2606E-02 | -1.2984E-01 | 3.5594E-01 | -6.9611E-01 | 8.2543E-01 | -3.5715E-01 | -3.5715E-01 |
| 10 | -5.5682E-02 | -4.8497E-02 | 1.6673E-02 | -4.2276E-01 | 3.9362E-01 | -1.4829E-01 | -1.4829E-01 |
| 11 | -1.7315E-01 | -1.2384E-01 | 2.9367E-01 | -3.6930E-01 | 1.7089E-01 | -4.6101E-03 | -4.6101E-03 |
| 12 | -1.4836E-01 | -7.8656E-02 | 1.2937E-01 | -6.3504E-02 | 4.7843E-02 | -9.9579E-03 | -9.9579E-03 |
| 13 | -3.8961E-02 | 5.6352E-02 | -2.1371E-01 | 3.0139E-01 | -1.7306E-01 | 3.5563E-02 | 3.5563E-02 |
| 14 | -7.5675E-02 | 1.3933E-01 | -1.2980E-01 | 6.5307E-02 | -1.7108E-02 | 1.3870E-03 | 1.3870E-03 |
| 15 | -1.9223E-02 | -5.9819E-02 | 3.3706E-02 | -8.1535E-03 | -1.7692E-03 | 9.8144E-04 | 9.8144E-04 |
| 16 | -8.3941E-02 | 3.2121E-02 | -1.1039E-02 | 2.0770E-03 | -2.4130E-04 | 1.8353E-05 | 1.8353E-05 |
| 17 | | | | | | | |
| 18 | | | | | | | |
| image plane | | | | | | | |

FIG. 13

| No. of surface (s) | surface type | radius of curvature (r) | thickness (t) | material | refractive index (n) | abbe number (v) | cone coefficient (k) |
|---|---|---|---|---|---|---|---|
| object plane | | | 1.1373E+00 | | | | |
| 1 | aspherical | -1.0542E+00 | 2.5000E-01 | plastic | 1.5400E+00 | 5.6000E+01 | -9.5718E+00 |
| 2 | aspherical | 3.0586E+00 | 2.2000E-01 | | | | -3.1476E-01 |
| 3 | aspherical | 8.6293E-01 | 1.0600E+00 | plastic | 1.5400E+00 | 5.5900E+01 | -4.3570E+00 |
| 4 | aspherical | -3.1978E+01 | 1.4000E-01 | | | | -1.0000E+00 |
| 5 | aspherical | -6.3976E+00 | 3.9000E-01 | plastic | 1.6300E+00 | 2.3300E+01 | -1.0000E+00 |
| 6 | aspherical | -3.8706E+00 | 2.6000E-01 | | | | -2.5367E+01 |
| 7 | aspherical | -2.0080E+00 | 2.5000E-01 | plastic | 1.6300E+00 | 2.3300E+01 | -1.4522E+01 |
| 8 | aspherical | 1.0738E+01 | 1.5000E-01 | | | | 1.9586E+02 |
| 9 | aspherical | 3.6304E+00 | 7.5000E-01 | plastic | 1.5400E+00 | 5.5900E+01 | -5.9681E+01 |
| 10 | aspherical | -1.9375E+00 | 1.0000E-01 | | | | -8.8569E+00 |
| aperture | | | 1.0000E-02 | | | | 0.0000E+00 |
| 13 | aspherical | 1.7106E+00 | 5.1000E-01 | plastic | 1.5400E+00 | 5.6500E+01 | -5.9510E-01 |
| 14 | aspherical | -1.6968E+01 | 8.4000E-02 | | | | -1.0000E+00 |
| 15 | aspherical | 3.7430E+00 | 3.0400E-01 | plastic | 1.6300E+00 | 2.3800E+01 | -3.4080E+00 |
| 16 | aspherical | 1.5910E+00 | 5.2300E-01 | | | | -1.0000E+00 |
| 17 | aspherical | 1.2945E+01 | 2.6400E-01 | plastic | 1.6300E+00 | 2.3800E+01 | 3.0000E+00 |
| 18 | aspherical | 5.0310E+00 | 1.5000E-01 | | | | -1.0000E+00 |
| 19 | aspherical | -1.1099E+01 | 6.2000E-01 | plastic | 1.5400E+00 | 5.5900E+01 | -1.0000E+00 |
| 20 | aspherical | -2.2360E+00 | 2.0000E-01 | | | | -6.3440E-01 |
| 21 | aspherical | -2.2830E+00 | 5.0000E-01 | plastic | 1.5400E+00 | 5.5900E+01 | 3.8940E-02 |
| 22 | aspherical | -1.2250E+00 | 6.9500E-01 | | | | -7.3600E-01 |
| 23 | aspherical | -1.1330E+00 | 3.6500E-01 | plastic | 1.5400E+00 | 5.5900E+01 | -2.9000E+00 |
| 24 | aspherical | -8.9280E+00 | 4.0000E-01 | | | | -1.0000E+00 |
| 23 | standard | | 3.0000E-01 | glass | 1.5200E+00 | 6.4200E+01 | 0.0000E+00 |
| 24 | standard | | 2.8300E-01 | | | | 0.0000E+00 |
| image plane | | | | | | | |

FIG. 14

| No. of surface(s) | A4 | A6 | A8 | A10 | A12 | A14 | A16 |
|---|---|---|---|---|---|---|---|
| object plane | | | | | | | |
| 1 | 1.0115E-01 | -3.4095E-02 | 1.1123E-02 | -2.0770E-03 | 2.4130E-04 | -1.8353E-05 | 0.0000E+00 |
| 2 | 7.6190E-03 | 6.0121E-02 | -3.3729E-02 | 8.1535E-03 | 1.7692E-03 | -9.8144E-04 | 0.0000E+00 |
| 3 | 7.3224E-02 | -1.3961E-01 | 1.2963E-01 | -6.5307E-02 | 1.7110E-02 | -1.3870E-03 | 0.0000E+00 |
| 4 | 6.0770E-02 | -6.1993E-02 | 2.1381E-01 | -3.0139E-01 | 1.7308E-01 | -3.5563E-02 | 0.0000E+00 |
| 5 | 1.5753E-01 | 7.8412E-02 | -1.2942E-01 | 6.3504E-02 | -4.7843E-02 | 9.9579E-03 | 0.0000E+00 |
| 6 | 1.4035E-01 | 1.3779E-01 | -2.9344E-01 | 3.8930E-01 | -1.7089E-01 | 4.6101E-03 | 0.0000E+00 |
| 7 | 7.1669E-02 | 5.7200E-02 | -1.6511E-01 | 4.2276E-01 | -3.9362E-01 | 1.4829E-01 | 0.0000E+00 |
| 8 | 1.0216E-01 | 9.1058E-02 | -3.6970E-01 | 6.9611E-01 | -8.2543E-01 | 3.5715E-01 | 0.0000E+00 |
| 7 | 1.0241E-01 | 6.6850E-02 | -2.4764E-02 | -8.1227E-02 | 1.3914E-01 | 2.5545E-01 | 0.0000E+00 |
| 8 | -1.4278E-01 | 1.6029E-01 | -1.3751E-01 | 3.7999E-01 | 2.3259E-01 | -2.4766E+00 | 0.0000E+00 |
| aperture | | | | | | | |
| 9 | 1.9778E-02 | 2.6600E-02 | -2.7100E-02 | 3.0350E-02 | -2.9340E-02 | 5.2095E-03 | 0.0000E+00 |
| 10 | 1.7610E-02 | 7.0250E-02 | -9.0700E-02 | -7.0320E-02 | 1.1980E-01 | -4.9810E-02 | 0.0000E+00 |
| 11 | -7.8460E-02 | 1.6230E-01 | -1.9220E-01 | 8.5050E-02 | -1.0570E-01 | 8.4440E-02 | 0.0000E+00 |
| 12 | -1.0230E-01 | 1.9480E-01 | -1.5220E-01 | 4.0420E-02 | 3.1020E-02 | -5.0220E-04 | 0.0000E+00 |
| 13 | -2.5100E-01 | 1.3180E-01 | -1.7630E-01 | 1.5510E-01 | -2.5200E-02 | 2.4990E-04 | 0.0000E+00 |
| 14 | -2.8100E-01 | 1.7690E-01 | -1.3380E-01 | 7.4630E-02 | -6.0110E-03 | -5.3630E-03 | 0.0000E+00 |
| 15 | -1.0590E-01 | 8.0240E-02 | 6.6760E-02 | -2.0930E-02 | 6.1790E-03 | -4.8920E-04 | 0.0000E+00 |
| 16 | -1.5630E-02 | 6.2300E-02 | -1.1060E-03 | 1.4770E-03 | 1.0420E-03 | 0.0000E+00 | 0.0000E+00 |
| 17 | -7.6760E-03 | -2.1700E-04 | 4.5400E-03 | 8.5000E-04 | 5.6500E-05 | -2.2900E-05 | 0.0000E+00 |
| 18 | 7.6590E-02 | -2.6700E-02 | 3.4030E-02 | -1.1210E-02 | 1.2230E-03 | -1.6380E-05 | 0.0000E+00 |
| 19 | 7.9790E-02 | -3.9000E-02 | 7.9170E-03 | -6.7810E-04 | 5.0650E-05 | -1.6300E-06 | -6.9800E-08 |
| 20 | 4.4000E-02 | -2.1960E-02 | 2.6530E-03 | 4.2130E-05 | -2.5930E-05 | -2.1360E-06 | 5.2660E-07 |
| 19 | | | | | | | |
| 20 | | | | | | | |
| image plane | | | | | | | |

FIG. 15

| No. of surface (s) | surface type | radius of curvature (r) | thickness (t) | material | radius of curvature (r) | abbe number (v) | cone coefficient (k) |
|---|---|---|---|---|---|---|---|
| object plane | | | infinity | | | | |
| 1 | aspherical | -6.9459E-01 | 7.0000E-01 | plastic | 1.5400E+00 | 5.5900E+01 | -2.95E+00 |
| 2 | aspherical | -6.2789E-01 | 3.2800E-01 | | | | -1.31E+00 |
| 3 | aspherical | 7.9679E-01 | 5.0000E-02 | plastic | 1.6300E+00 | 2.3400E+01 | -9.31E+00 |
| 4 | aspherical | 4.0147E-01 | 3.2000E-01 | | | | -1.69E+00 |
| 5 | aspherical | 1.2747E+00 | 2.2000E-01 | plastic | 1.5400E+00 | 5.5900E+01 | -3.01E+00 |
| 6 | aspherical | -9.0075E-01 | 4.3200E-01 | | | | -2.07E+01 |
| aperture | | | 0.0000E+00 | | | | |
| 7 | aspherical | 8.4932E-01 | 5.0000E-02 | plastic | 1.5400E+00 | 5.5900E+01 | -1.89E+01 |
| 8 | aspherical | -1.2535E+00 | 4.3200E-01 | | | | -2.50E+00 |
| 9 | aspherical | -4.0619E-01 | 2.2000E-01 | plastic | 1.6300E+00 | 2.3400E+01 | -1.74E+00 |
| 10 | aspherical | -8.0047E-01 | 3.2000E-01 | | | | -8.82E+00 |
| 11 | aspherical | 6.4576E-01 | 5.0000E-02 | plastic | 1.5400E+00 | 5.5900E+01 | -1.34E+00 |
| 12 | aspherical | 6.7484E-01 | 3.2800E-01 | | | | -2.93E+00 |
| image plane | | | 5.0699E-01 | | | | |

FIG. 16

| No. of surface (s) | A4 | A6 | A8 | A10 | A12 | A14 |
|---|---|---|---|---|---|---|
| object plane | | | | | | |
| 1 | 2.0534E+00 | -3.2463E+00 | -3.9032E+00 | 1.3321E+01 | -2.8748E+00 | 3.4280E-01 |
| 2 | 2.6292E+00 | -7.8228E+00 | 1.3326E+01 | -3.1100E+01 | 7.1463E+01 | 0.0000E+00 |
| 3 | 1.4711E-01 | -8.5739E+00 | 9.5632E+00 | 3.4532E+01 | 0.0000E+00 | 0.0000E+00 |
| 4 | -3.7336E+00 | 5.4645E+01 | -5.3815E+02 | 3.0755E+03 | -5.2974E+03 | 0.0000E+00 |
| 5 | 9.4505E-01 | -2.8840E-01 | 3.1876E+01 | 0.0000E+00 | 0.0000E+00 | 0.0000E+00 |
| 6 | -1.6503E+00 | -1.4603E+01 | 1.5714E+01 | 0.0000E+00 | 0.0000E+00 | 0.0000E+00 |
| aperture | 0.0000E+00 | 0.0000E+00 | 0.0000E+00 | 0.0000E+00 | 0.0000E+00 | 0.0000E+00 |
| 7 | 1.6180E+00 | 4.9285E+00 | -2.3446E+02 | 0.0000E+00 | 0.0000E+00 | 0.0000E+00 |
| 8 | -9.7361E-01 | -7.7634E-02 | -3.8807E+00 | 0.0000E+00 | 0.0000E+00 | 0.0000E+00 |
| 9 | 3.8047E+00 | -5.4198E+01 | 5.4180E+02 | -3.0595E+03 | 5.4967E+03 | 0.0000E+00 |
| 10 | -1.5817E-01 | 8.5474E+00 | -9.6418E+00 | -3.4805E+01 | 0.0000E+00 | 0.0000E+00 |
| 11 | -2.6405E+00 | 7.9176E+00 | -1.2890E+01 | 3.0707E+01 | -6.9991E+01 | 0.0000E+00 |
| 12 | -2.0094E+00 | 3.1507E+00 | 3.7539E+00 | -1.3381E+01 | 4.1735E+00 | -3.4280E-01 |
| image plane | | | | | | |

FIG. 17

MINIATURE IMAGING LENS FOR CLOSE-RANGE IMAGING

CROSS REFERENCE TO THE RELATED APPLICATIONS

This application is the national phase entry of International Application No. PCT/CN2019/103999, filed on Sep. 2, 2019, which is based upon and claims priority to Chinese Patent Application No. 201910651974.9, filed on Jul. 18, 2019, the entire contents of which are incorporated herein by reference.

TECHNICAL FIELD

The disclosure relates to a field of imaging, and in particular relates to a miniature imaging lens for close-range imaging, which is particularly suitable for close-range imaging of portable electronic products.

BACKGROUND

Imaging devices are becoming more and more popular in daily life. Imaging devices such as mobile phone cameras, computer cameras, driving recorders, and surveillance cameras appear in people's daily life every day. Imaging devices are also developing towards miniaturization, and they can still maintain high imaging quality while being miniaturized. Imaging devices in daily life are mostly camera systems. Characteristics of the camera system are that its object distance is much larger than its image distance (much more than 10 times), and the farthest focusing object plane is often located at infinity. In order to obtain a compact structure of a miniaturized imaging device, the distance between a lens and a detector is usually short, and the distance between an object to be imaged and the lens is usually much larger than the distance between the lens and the detector, which is also logical as a camera system.

As people have more and more functional requirements for imaging devices in daily life, they also need to image close-range objects, such as macro imaging and even microscopic imaging. However, traditional imaging devices are mostly camera systems, and their lenses are designed for long-range imaging. Although the object distance can be reduced by increasing the image distance to image close-range objects, it is far from its optimal imaging conditions at this time, there will be large aberrations and poor imaging quality. Therefore, there is a need for a lens capable of high-quality close-range imaging.

SUMMARY

For at least one of the above defects or improvement requirements of the prior art, the present disclosure provides a miniature imaging lens for close-range imaging, which proposes a sandwich structure lens configuration composed of a first lens group, an aperture and a second lens group, which can obtain a high close-range imaging effect under the condition of miniaturization, and can effectively reduce aberrations of close-range imaging, especially distortion and chromatic aberration; it can also effectively reduce a diameter of the lens, reduce a size of the lens, and reduce processing difficulty and processing cost, and can effectively reduce the total optical tube length of the structure consisting of the lens and detectors.

In order to achieve the above purposes, according to an aspect of the present disclosure, a miniature imaging lens for close-range imaging is provided, including: a first lens group, an aperture and a second lens group sequentially arranged in a direction from the object side to the image side of an optical axis.

The first lens group and the second lens group have positive focal power, an object-side clear aperture of the first lens group is larger than an image-side clear aperture of the first lens group, and an object-side clear aperture of the second lens group is less than an image-side clear aperture of the second lens group; a focal length of the first lens group is 40 mm, and a focal length of the second lens group is $f_{200} \leq 20$ mm.

When in use, the distance $od_{100}$ between an object to be imaged and an object-side principal plane of the first lens group is less than 2 times of the focal length of the first lens group, that is, $$od_{100} < 2f_{100} \qquad \text{(formula 1)};$$

the distance $id_{200}$ between an image-side principal plane of the second lens group and an image plane of the miniature imaging lens is less than 2 times of the focal length of the second lens group, that is, $$id_{200} < 2f_{200}, \qquad \text{(formula 2)};$$

an image-side numerical aperture $NA_{img100}$ of the first lens group and an object-side numerical aperture $NA_{obj200}$ of the second lens group satisfy the following condition:

$$0 < NA_{img100} \cdot NA_{obj200} < 0.05 \qquad \text{(formula 3)}.$$

Optionally, a distance $sd_{100}$ from the aperture to an edge of the first lens group along an optical axis direction satisfies a formula:

$$sd_{100} \leq f_{100} \qquad \text{(formula 4)}$$

a distance $sd_{200}$ from the aperture to an edge of the second lens group along the optical axis direction satisfies a formula:

$$sd_{200} \leq f_{200} \qquad \text{(formula 5)}.$$

Optionally, the second lens group includes at least three lenses sequentially arranged in the direction from the object side to the image side of the optical axis.

Optionally, the last two lenses of the second lens group sequentially arranged in the direction from the object side to the image side of the optical axis are configured as follows: an image-side surface of the penultimate lens is convex, and at least one of the object-side surface and the image-side surface of the penultimate lens is aspherical; both an object-side surface and an image-side surface of the last lens are concave, and at least one of the object-side surface and the image-side surface of the last lens is aspherical.

Optionally, the last two lenses of the second lens group sequentially arranged in the direction from the object side to the image side of the optical axis are configured as follows: an image-side surface of the penultimate lens is convex, and at least one of the object-side surface and the image-side surface of the penultimate lens is aspherical; an object-side surface of the last lens is convex, an image-side surface of the last lens is concave, and at least one of the object-side surface and the image-side surface of the last lens is aspherical, and the last lens has a region of which thickness is increased as a distance from the optical axis is increased.

Optionally, the last two lenses of the second lens group sequentially arranged in the direction from the object side to the image side of the optical axis are configured as follows: an object-side surface of the penultimate lens is concave, an image-side surface of the penultimate lens is convex, and at least one of the object-side surface and the image-side surface is aspherical; an object-side surface of the last lens is concave, an image-side surface of the last lens is convex, and at least one of the object-side surface and the image-side surface of the last lens is aspherical.

Optionally, the last two lenses of the second lens group sequentially arranged in the direction from the object side to the image side of the optical axis are configured as follows: an image-side surface of the penultimate lens is convex, and at least one of the object-side surface and the image-side surface of the penultimate lens is aspherical; an object-side surface of the last lens is convex, an image-side surface of the last lens is concave, and at least one of the object-side surface and the image-side surface of the last lens is aspherical, and the last lens has a region of which thickness is decreased as a distance from the optical axis is increased.

Optionally, at least one of the object-side surface and the image-side surface of the last lens has an inflection point.

Optionally, the second lens group includes a first lens, a second lens, a third lens, a fourth lens and a fifth lens sequentially arranged in the direction from the object side to the image side of the optical axis, wherein both an object-side surface and an image-side surface of the first lens are convex; both an object-side surface and an image-side surface of the second lens are concave; the center of an object-side surface of the third lens is convex, the off-axis edge of the third lens becomes concave, and the center of an image-side surface of the third lens is concave, the off-axis edge of the third lens becomes convex; an image-side surface of the fourth lens is convex, and at least one of the object-side surface and the image-side surface of the fourth lens is aspherical; and both an object-side surface and an image-side surface of the fifth lens are concave, and at least one of the object-side surface and the image-side surface of the fifth lens is aspherical.

Optionally, the second lens group includes a first lens, a second lens, a third lens and a fourth lens sequentially arranged in the direction from the object side to the image side of the optical axis, wherein both an object-side surface and an image-side surface of the first lens are convex; both an object-side surface and an image-side surface of the second lens are concave, wherein the concavity of the object-side surface of the second lens is greater than that of the image-side surface of the second lens, and the image-side surface of the second lens has an inflection point; an image-side surface of the third lens is convex, and at least one of the object-side surface and the image-side surface of the third lens is aspherical; an object-side surface of the fourth lens is convex, an image-side surface of the fourth lens is concave, and at least one of the object-side surface and the image-side surface of the fourth lens is aspherical, and the fourth lens has a region of which thickness is increased as a distance from the optical axis is increased.

Optionally, the second lens group includes a first lens, a second lens, a third lens, a fourth lens, a fifth lens and a sixth lens sequentially arranged in the direction from the object side to the image side of the optical axis, wherein both an object-side surface and an image-side surface of the first lens are convex; an object-side surface of the second lens is convex, and an image-side surface of the second lens is concave; the center of an object-side surface of the third lens is convex, the off-axis edge of the third lens becomes concave, and the center of an image-side surface of the third lens is concave, the off-axis edge of the third lens becomes convex; an object-side surface of the fourth lens is concave, and an image-side surface of the fourth lens is convex; an object-side surface of the fifth lens is concave, and an image-side surface of the fourth lens is convex, and at least one of the object-side surface and the image-side surface of the fifth lens is aspherical; an object-side surface of the sixth lens is concave, and an image-side surface of the sixth lens is convex, and at least one of the object-side surface and the image-side surface of the sixth lens is aspherical.

Optionally, the second lens group includes a first lens, a second lens and a third lens sequentially arranged in the direction from the object side to the image side of the optical axis, wherein both an object-side surface and an image-side surface of the first lens are convex; an image-side surface of the second lens is convex, and at least one of the object-side surface and the image-side surface of the second lens is aspherical; an object-side surface of the third lens is convex, an image-side surface of the third lens is concave, and at least one of the object-side surface and the image-side surface of the third lens is aspherical, and the third lens has a region of which thickness is decreased as a distance from the optical axis is increased.

Optionally, the first lens group includes at least three lenses sequentially arranged in the direction from the object side to the image side of the optical axis.

Optionally, the first two lenses of the first lens group sequentially arranged in the direction from the object side to the image side of the optical axis are configured as follows: both an object-side surface and an image-side surface of the first lens are concave, and at least one of the object-side surface and the image-side surface of the first lens is aspherical; an image-side surface of the second lens is convex, and at least one of the object-side surface and the image-side surface of the second lens is aspherical.

Optionally, the first two lenses of the first lens group sequentially arranged in the direction from the object side to the image side of the optical axis are configured as follows: an object-side surface of the first lens is concave, an image-side surface of the first lens is convex, and at least one of the object-side surface and the image-side surface of the first lens is aspherical, and the first lens has a region of which thickness is decreased as a distance from the optical axis is increased; an object-side surface of the second lens is convex, an image-side surface of the second lens is concave, and at least one of the object-side surface and the image-side surface of the second lens is aspherical.

Optionally, the first two lenses of the first lens group sequentially arranged in the direction from the object side to the image side of the optical axis are configured as follows: both an object-side surface and an image-side surface of the first lens are concave, and at least one of the object-side surface and the image-side surface of the first lens is aspherical; an object-side surface of the second lens is convex, and at least one of the object-side surface and the image-side surface of the second lens is aspherical.

Optionally, at least one of the object-side surface and the image-side surface of the first lens has an inflection point.

Optionally, the first lens group includes a first lens, a second lens, a third lens and a fourth lens sequentially arranged in the direction from the object side to the image side of the optical axis, wherein both an object-side surface and an image-side surface of the first lens are concave, and at least one of the object-side surface and the image-side surface of the first lens is aspherical; an object-side surface of the second lens is convex, an image-side surface of the second lens is concave, and at least one of the object-side surface and the image-side surface of the second lens is aspherical, and the second lens has a region of which thickness is decreased as a distance from the optical axis is increased; an object-side surface of the third lens is concave, but the concavity of the object-side surface of the third lens is less than that of the object-side surface of the first lens, and an image-side surface of the third lens is concave; both an object-side surface and an image-side surface of the fourth lens are convex.

Optionally, the first lens group includes a first lens, a second lens and a third lens sequentially arranged in the direction from the object side to the image side of the optical axis, wherein an object-side surface of the first lens is concave, an image-side surface of the first lens is convex, and at least one of the object-side surface and the image-side surface of the first lens is aspherical, and the first lens has a region of which thickness is decreased as a distance from the optical axis is increased; an object-side surface of the second lens is convex, an image-side surface of the second lens is concave, and at least one of the object-side surface and the image-side surface of the second lens is aspherical; both an object-side surface and an image-side surface of the third lens are convex.

Optionally, the first lens group includes a first lens, a second lens, a third lens, a fourth lens and a fifth lens sequentially arranged in the direction from the object side to the image side of the optical axis, wherein both an object-side surface and an image-side surface of the first lens are concave, and at least one of the object-side surface and the image-side surface of the first lens is aspherical; an object-side surface of the second lens is convex, an image-side surface of the second lens is concave, and at least one of the object-side surface and the image-side surface of the second lens is aspherical, and the second lens has a region of which thickness is decreased as a distance from the optical axis is increased; an object-side surface of the third lens is concave, but the concavity of the object-side surface of the third lens is less than that of the object-side surface of the first lens, and an image-side surface of the third lens is convex; both an object-side surface and an image-side surface of the fourth lens are concave; both an object-side surface and an image-side surface of the fifth lens are convex.

Optionally, the miniature imaging lens for close-range imaging is a miniature imaging lens for portable electronic products.

The above technical features may be combined with each other as long as they do not conflict with each other.

In general, compared with the prior art, the above technical solutions conceived by the present disclosure have at least following beneficial effects.

Most of the traditional miniature lenses are camera lenses, which are designed for the situation that the object distance is much larger than the image distance, and are not suitable for close-range macro and microscopic imaging; the miniature imaging lens for close-range imaging of the present disclosure proposes a sandwich structure lens configuration composed of a lens group, an aperture and a second lens group, which can obtain a high close-range imaging effect under the condition of miniaturization, and can effectively reduce aberrations of close-range imaging, especially distortion and chromatic aberration. The lens that satisfies the structural features and the parameter formula of the present disclosure can effectively reduce a diameter of the lens, reduce a size of the lens, and reduce processing difficulty and processing cost, and can effectively reduce the total optical tube length of the structure consisting of the lens and detectors.

BRIEF DESCRIPTION OF THE DRAWINGS

FIG. 8 is a first parameter table diagram of the first embodiment of the present disclosure;

FIG. 9 is a second parameter table diagram of the first embodiment of the present disclosure;

FIG. 10 is a first parameter table diagrams of the second embodiment of the present disclosure;

FIG. 11 is a second parameter table diagram of the second embodiment of the present disclosure;

FIG. 12 is a first parameter table diagrams of the third embodiment of the present disclosure;

FIG. 13 is a second parameter table diagram of the third embodiment of the present disclosure;

FIG. 14 is a first parameter table diagrams of the fourth embodiment of the present disclosure;

FIG. 15 is a second parameter table diagram of the fourth embodiment of the present disclosure;

FIG. 16 is a first parameter table diagrams of the fifth embodiment of the present disclosure;

FIG. 17 is a second parameter table diagram of the fifth embodiment of the present disclosure.

DETAILED DESCRIPTION

In order to make the objectives, technical solutions and advantages of the present disclosure much clearer, the present disclosure will be further described in detail below with reference to the accompanying drawings and embodiments. It should be understood that the specific embodiments described herein are only used to explain the present disclosure, but not to limit the present disclosure. In addition, the technical features involved in the various embodiments of the present disclosure described below may be combined with each other as long as they do not conflict with each other. The present disclosure will be further described in detail below in conjunction with specific embodiments.

Figure 1:
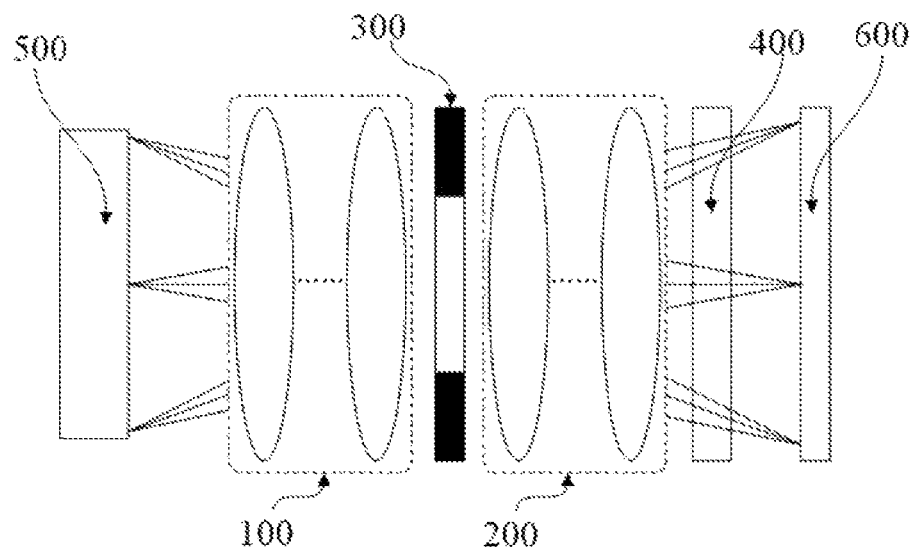
FIG. 1 is a schematic structural diagram of a miniature imaging lens for close-range imaging according to an embodiment of the present disclosure.

As an embodiment of the present disclosure, as shown in FIG. 1, the present disclosure provides a miniature imaging lens for close-range imaging, which includes a first lens group 100, an aperture 300 and a second lens group 200 sequentially arranged in a direction from the object side to the image side of an optical axis.

The first lens group 100 and the second lens group 200 have positive focal power; an object-side clear aperture of the first lens group 100 is larger than an image-side clear aperture of the first lens group 100, and an object-side clear aperture of the second lens group 200 is less than an image-side clear aperture of the second lens group 200; a focal length of the first lens group 100 is $f_{100} \leq 40$ mm, and a focal length of the second lens group 200 is $f_{200} \leq 20$ mm.

When in use, the distance $od_{100}$ between an object 500 to be imaged and an object-side principal plane of the first lens group 100 is less than 2 times of the focal length of the first lens group 100, that is, $$od_{100} < 2f_{100} \quad \text{(formula 1)}$$

The distance $id_{200}$ between an image-side principal plane of the second lens group (200) and an image plane of the miniature imaging lens is less than 2 times of the focal length of the second lens group (200), that is, $$id_{200} < 2f_{200} \quad \text{(formula 2)}$$

Under the conditions determined by the above two formulas, for close-range imaging, especially for ultra-close-range imaging, the distance between the image-side surface of the second lens group 200 and a detector 600 may be significantly reduced, which is beneficial to reduce the total optical tube length and facilitates the miniaturization of the device.

An image-side numerical aperture $NA_{img100}$ of the first lens group 100 and an object-side numerical aperture $NA_{obj200}$ of the second lens group 200 satisfy the following condition:

$$0 < NA_{img100}, NA_{obj200} < 0.05 \quad \text{(formula 3)}$$

After the object 500 to be imaged is imaged by the first lens group 100 and the second lens group 200, it is finally imaged on a photosensitive surface of the detector 600. Further, when a wavelength selection is required, a filter 400 is further included between the second lens group 200 and the photosensitive surface of the detector 600. Since the numerical aperture of a light beam in the space between the first lens group 100 and the second lens group 200 is small, it is convenient to reduce the influence of manufacturing and assembly errors on the quality of the light beam, thus this design is beneficial to improve the yield of good product during production. The second lens group 200 has at least one lens of which image-side surface is aspherical, the image-side surface is concave near the optical axis, and a portion of the image-side surface that is far away from the optical axis has a reduced slop (the slop refers to the absolute value of the arctangent of the angle between the optical axis and the tangent of a curve formed by the intersection of the image-side surface and the meridional plane), such design is beneficial to suppress the aberration of the off-axis field of view (FOV) in the case of a large field angle, especially to suppress astigmatism and field curvature, so as to improve the imaging quality of the present disclosure in the case of a large object-side field of view (FOV).

The aperture 300 is a physical entity capable of defining a clear aperture. The outside of the first lens group 100 is defined as the object side of the entire lens, and the outside of the second lens group is defined as the image side of the entire lens. The aperture 300 is located between the first lens group 100 and the second lens group 200, which facilitates correction of distortion and chromatic aberration in imaging.

A distance $sd_{100}$ from the aperture 300 to an edge of the first lens group 100 along an optical axis direction satisfies a formula:

$$sd_{100} < f_{100} \quad \text{(formula 4)};$$

A distance $sd_{200}$ from the aperture 300 to an edge of the second lens group 200 along the optical axis direction satisfies a formula:

$$sd_{200} < f_{200} \quad \text{(formula 5)}.$$

When the distance between the aperture 300 and the first lens group 100 and the distance between the aperture 300 and the second lens group 200 satisfy the above formulas 4 and 5, it is beneficial to reduce the height of light on the image-side surface of the first lens group 100 and the object-side surface of the second lens group 200 in the case of large field of view (FOV) imaging (i.e. the distance from the intersection point of light and the surface to the optical axis), so as to reduce a diameter of the first lens group 100 and the second lens group 200, which is convenient for miniaturization and reduction of processing costs (large-diameter lenses have high processing costs); further, it is also beneficial to correct the low-order spherical aberration of a first lens on the image-side of the first lens group 100 and a first lens on the object-side of the second lens group 200, thereby improving image quality. To sum up, the beneficial effects of the present disclosure are as follows: a sandwich structure lens configuration composed of the lens group 100, the aperture 300 and the second lens group 200 is provided, which can obtain a high close-range imaging effect under the condition of miniaturization, and can effectively reduce aberrations of close-range imaging, especially distortion and chromatic aberration. The lens that satisfies the structural features and the parameter formula of the present disclosure can effectively reduce a diameter of the lens, reduce a size of the lens, and reduce processing difficulty and processing cost, and can effectively reduce the total optical tube length of the structure consisting of the lens and detectors.

In the present disclosure, the second lens group 200 includes at least three lenses sequentially arranged in the direction from the object side to the image side of the optical axis; the first lens group 100 includes at least three lenses sequentially arranged in the direction from the object side to the image side of the optical axis. The respective numbers of the first lens group 100 and the second lens group 200 may be freely combined, and different structural configurations of the first lens group 100 and the second lens group 200 may also be freely combined; the first lens group 100 and/or the second lens group 200 have an integral axial adjustment device; further, at least one lens of the first lens group 100 and/or the second lens group 200 has its individual axial adjustment device.

The last two lenses of the second lens group 200 sequentially arranged in the direction from the object side to the image side of the optical axis have the following four arrangement types.

The first type of the second lens group: an image-side surface of the penultimate lens is convex, and at least one of the object-side surface and the image-side surface of the penultimate lens is aspherical; both an object-side surface and an image-side surface of the last lens are concave, and at least one of the object-side surface and the image-side surface of the last lens is aspherical.

The second type of the second lens group: an image-side surface of the penultimate lens is convex, and at least one of the object-side surface and the image-side surface of the penultimate lens is aspherical; an object-side surface of the last lens is convex, an image-side surface of the last lens is concave, and at least one of the object-side surface and the image-side surface of the last lens is aspherical, and the last lens has a region of which thickness is increased as a distance from the optical axis is increased.

The third type of the second lens group: an object-side surface of the penultimate lens is concave, an image-side surface of the penultimate lens is convex, and at least one of the object-side surface and the image-side surface is aspherical; an object-side surface of the last lens is concave, an image-side surface of the last lens is convex, and at least one of the object-side surface and the image-side surface of the last lens is aspherical.

The fourth type of the second lens group: an image-side surface of the penultimate lens is convex, and at least one of the object-side surface and the image-side surface of the penultimate lens is aspherical; an object-side surface of the last lens is convex, an image-side surface of the last lens is concave, and at least one of the object-side surface and the image-side surface of the last lens is aspherical, and the last lens has a region of which thickness is decreased as a distance from the optical axis is increased.

In various second lens groups: at least one of the object-side surface and the image-side surface of the last lens has an inflection point.

The first two lenses of the first lens group 100 sequentially arranged in the direction from the object side to the image side of the optical axis have the following three arrangement types.

The first type of the first lens group: both an object-side surface and an image-side surface of the first lens are concave, and at least one of the object-side surface and the image-side surface of the first lens is aspherical; an image-side surface of the second lens is convex, and at least one of the object-side surface and the image-side surface of the second lens is aspherical.

The second type of the first lens group: an object-side surface of the first lens is concave, an image-side surface of the first lens is convex, and at least one of the object-side surface and the image-side surface of the first lens is aspherical, and the first lens has a region of which thickness is decreased as a distance from the optical axis is increased; an object-side surface of the second lens is convex, an image-side surface of the second lens is concave, and at least one of the object-side surface and the image-side surface of the second lens is aspherical.

The third type of the first lens group: both an object-side surface and an image-side surface of the first lens are concave, and at least one of the object-side surface and the image-side surface of the first lens is aspherical; an object-side surface of the second lens is convex, and at least one of the object-side surface and the image-side surface of the second lens is aspherical.

At least one of the object-side surfaces and the image-side surfaces of the first lenses in the various first lens groups has an inflection point.

All lenses have their applicable object distance range. A situation where the present disclosure works better is that an object plane 500 is located at the object-side focal plane of the first lens group 100, and the photosensitive surface of the detector 600 is located at the image-side focal plane of the second lens group 200. When a filter 400 is further included behind the second lens group 200, the image-side focal plane of the second lens group 200 is the actual focal plane after considering the refraction effect of the filter 400. In this case, the light emitted from an object point on the object plane 500 is approximately collimated light after passing through the first lens group 100, and the collimated light forms a point on the photosensitive surface of the detector 600 after being focused by the second lens group 200. When the object plane 500 is not located at the above ideal position, it needs to perform further focusing. The focusing may be performed either by adjusting the distance from the overall of the first lens group 100 and the second lens group 200 to the detector 600 of the present disclosure, or by adjusting one of the first lens group 100 or the second lens group 200 of the present disclosure.

The lens in the lens of the present disclosure may be glass, plastic or other light-transmitting materials. When using plastic materials, it may effectively reduce weight and cost. The light-transmitting surface of the lens may be aspherical, so as to obtain more degrees of freedom for aberration correction, thereby correcting aberrations better. The second lens group 200 of the present disclosure has at least one lens of which image-side surface is aspherical, and the curve formed by the cross-section through the optical axis of the lens includes an inflection point, that is, the concavity-convexity of the image-side surface is changed. Such design is beneficial to suppress the aberration of the off-axis field of view (FOV) in the case of a large field angle, so as to improve the imaging quality of the present disclosure in the case of a large object-side field of view (FOV).

According to an embodiment of the present disclosure, the aperture 300 is disposed in the middle of the lens, and the middle of the lens means that both the object-side and the image-side of the aperture include lenses. Such method of setting aperture is called aperture being in the middle. The aperture being in the middle helps to improve the field angle and has a better effect on suppressing distortion and chromatic aberration. Optionally, the miniature imaging lens for close-range imaging is a miniature imaging lens for portable electronic products.

Further, the lens of the present disclosure includes a mechanical housing as a package, and forms an imaging module with a motor, a planar array photodetector (such as a CMOS image sensor, etc.), which can be used in mobile phones, tablet computers, and wearable devices (such as smart bracelets, smart watches, etc.), small cameras (such as sports cameras, etc.) and other electronic products, to achieve close-range imaging functions, and even microscopic imaging functions.

Specific embodiments of the present disclosure are presented below.

First Embodiment

Figure 2:
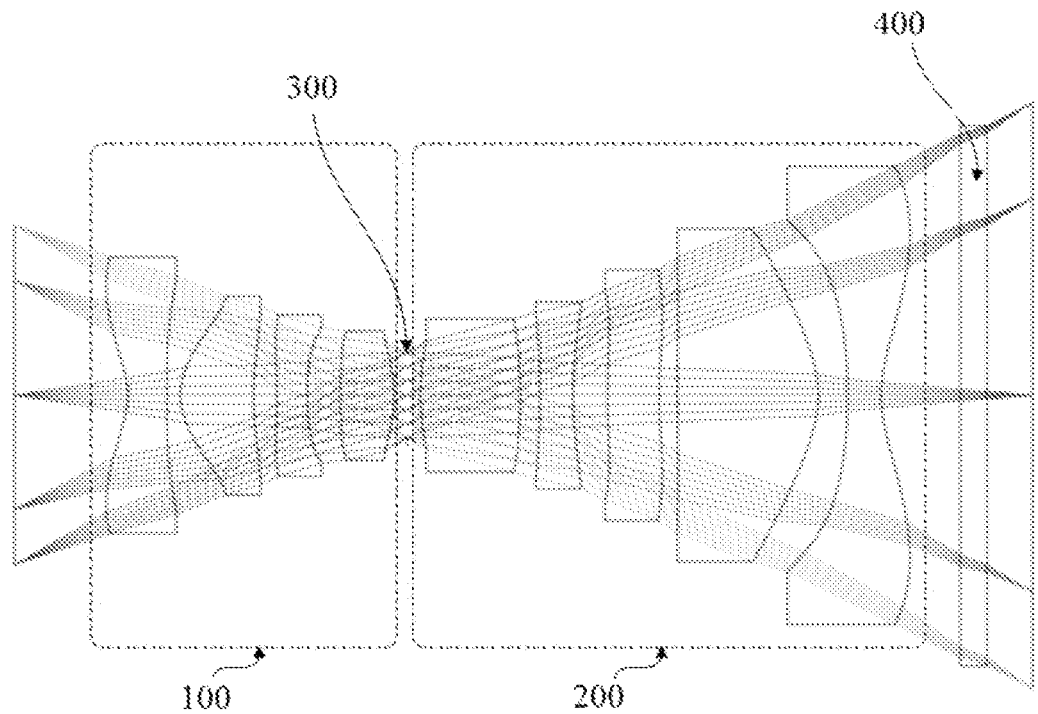
FIG. 2 is a schematic structural diagram of a first embodiment of the present disclosure.

The first embodiment of the present disclosure is shown in FIG. 2. The first lens group 100 includes four lenses, and the second lens group 200 includes five lenses. All of the above 9 lenses are aspherical lenses. The surface type of the aspheric lens is represented by the curve equation as follows (the aspheric surface is formed by revolving the curve around the optical axis):

$$X(Y) = (Y^2/r) \Big/ \left(1 + \sqrt{1 - (1+k)(Y/r)^2}\right) + \sum_i A_i Y^i$$

where: X represents a relative distance between a point on the aspheric surface whose distance from the optical axis is Y and a tangent plane at the intersection of the aspheric surface and the optical axis;

Y represents a vertical distance between a point on the aspheric curve and the optical axis;

r represents radius of curvature;

k represents cone coefficient;

$A_i$ represents $i^{th}$ order aspheric coefficient.

The parameters of each surface of the lens in this embodiment are shown in FIG. 8 and FIG. 9.

In FIG. 8, the units of length physical quantities such as radius of curvature r and thickness T are all millimeters; surfaces 1 to 18 are surfaces from the object side to the image side of the present disclosure in turn, and surfaces 19 to 20 are filters. A2 to A14 in Table 2 are the aforementioned 2nd to 14th order aspheric coefficients.

The object-side surface of a first lens of the first lens group 100 in this embodiment is aspherical, the object-side surface is concave near the optical axis, and an inflection point is appeared at a portion of the object-side surface that is far away from the optical axis, and the image-side surface of the first lens is aspherical and concave; the object-side surface of a second lens of the first lens group 100 is aspherical, and is convex near the optical axis, and the image-side surface of the second lens is concave, the second lens as a whole is thicker in the center than the sides; the object-side surface of a third lens of the first lens group 100 is also concave, but its concavity is less than that of the object-side surface of the first lens, the image-side surface of the third lens is concave, and both the object-side surface and the image-side surface of the third lens are aspherical; both the object-side surface and the image-side surface of a fourth lens of the first lens group 100 are aspherical and convex.

The object-side surface and the image-side surface of a first lens of the second lens group 200 in this embodiment are aspherical and convex; the object-side surface and the image-side surface of a second lens of the second lens group 200 are aspherical and concave; the center of the object-side surface of a third lens of the second lens group 200 is convex, and a concave surface appears in the off-axis position of the object-side surface of the third lens, the center of the image-side surface of the third lens is concave, and a convex surface appears in the off-axis position of the image-side surface of the third lens; the object-side surface of a fourth lens of the second lens group 200 is a relatively flat aspherical surface, the image-side surface of the fourth lens is aspherical and convex; the object-side surface of the last lens of the second lens group 200 is aspherical and concave, the image-side surface of the last lens is aspherical, the object-side surface is concave near the optical axis, and an inflection point is appeared at a portion of the object-side surface that is far away from the optical axis.

The lens shown in this embodiment can obtain an object-side numerical aperture of more than 0.15 at a field angle of ±30°, and the Strehl ratio can be higher than 0.9 in most areas of the full FOV, which has good image quality.

Second Embodiment

Figure 3:
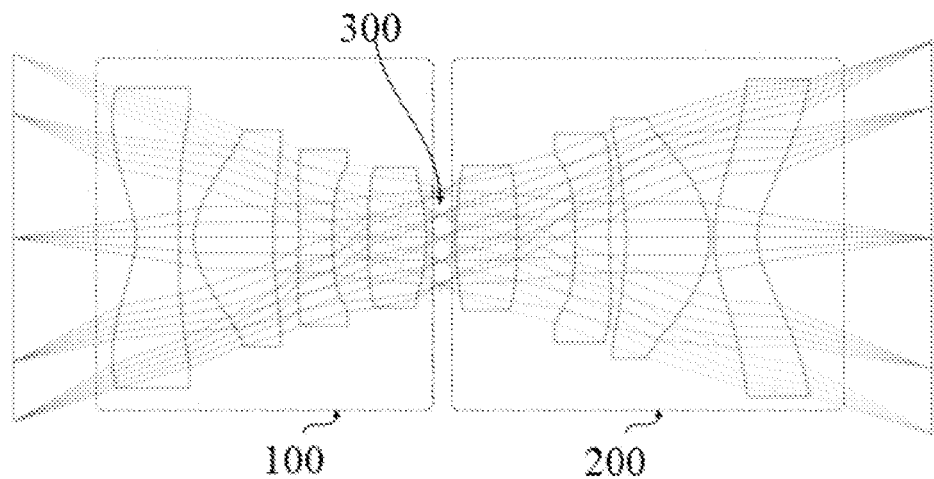
FIG. 3 is a schematic structural diagram of a second embodiment of the present disclosure.

The second embodiment of the present disclosure is shown in FIG. 3. The first lens group 100 includes four lenses, and the second lens group 200 includes four lenses. The parameters of each surface of the lenses in this embodiment are shown in FIG. 10 and FIG. 11, and the definitions of variables are similar to those described above, and will not be repeated here.

The object-side surface of a first lens of the first lens group 100 in this embodiment is aspherical, the object-side surface is concave near the optical axis, and an inflection point is appeared at a portion of the object-side surface that is far away from the optical axis, and the image-side surface of the first lens is aspherical and concave; the object-side surface of a second lens of the first lens group 100 is aspherical, and is convex near the optical axis, and the image-side surface of the second lens is concave, the second lens as a whole is thicker in the center than the sides; the object-side surface of a third lens of the first lens group 100 is also concave, but its concavity is less than that of the object-side surface of the first lens, the image-side surface of the third lens is concave, and both the object-side surface and the image-side surface of the third lens are aspherical; both the object-side surface and the image-side surface of a fourth lens of the first lens group 100 are aspherical and convex.

The object-side surface and the image-side surface of a first lens of the second lens group 200 in this embodiment are aspherical and convex; the object-side surface and the image-side surface of a second lens of the second lens group 200 are aspherical and concave, wherein the concavity of the object-side surface of the second lens is greater than that of the image-side surface of the second lens, and an inflection point is appeared at a portion of the imaged-side surface that is far away from the optical axis; the center of the object-side surface of a third lens of the second lens group 200 is concave, the image-side surface of the third lens is aspherical and convex; the object-side surface of the last lens of the second lens group 200 is aspherical and convex, the image-side surface of the last lens is aspherical and concave, and the central thickness of the last lens is smaller than the thickness at the off-axis position.

Compared with the first embodiment, the second embodiment has a smaller magnifying power, and is suitable for occasions requiring the smaller magnifying power.

Third Embodiment

Figure 4:
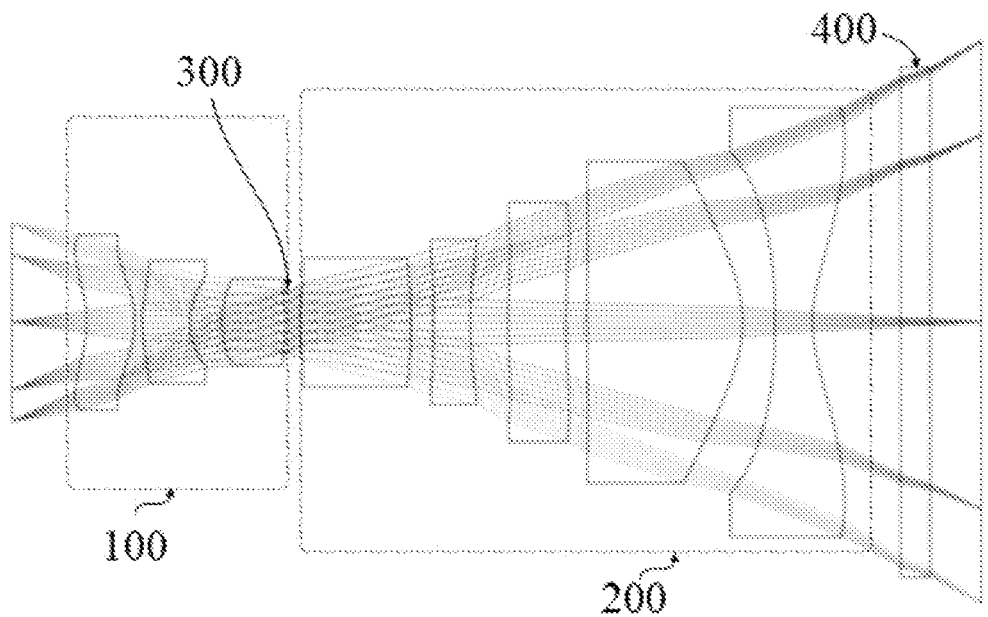
FIG. 4 is a schematic structural diagram of a third embodiment of the present disclosure.

The third embodiment of the present disclosure is shown in FIG. 4, the first lens group 100 includes three lenses, and the second lens group 200 includes four lenses. The parameters of each surface of the lenses in this embodiment are shown in FIG. 12 and FIG. 13, and the definitions of variables are similar to those described above, and will not be repeated here.

The object-side surface of a first lens of the first lens group 100 in this embodiment is aspherical, the object-side surface is concave near the optical axis, and an inflection point is appeared at a portion of the object-side surface that is far away from the optical axis, and the image-side surface of the first lens is aspherical and convex; the object-side surface of a second lens of the first lens group 100 is aspherical and convex, and the image-side surface of the second lens is concave; both the object-side surface and the image-side surface of a third lens of the first lens group 100 are aspherical and convex.

The object-side surface and the image-side surface of a first lens of the second lens group 200 in this embodiment are aspherical and convex; the object-side surface and the image-side surface of a second lens of the second lens group 200 are aspherical and concave; the center of the object-side surface of a third lens of the second lens group 200 is convex, and a concave surface appears in the off-axis position of the object-side surface of the third lens, the center of the image-side surface of the third lens is concave, and a convex surface appears in the off-axis position of the image-side surface of the third lens; the object-side surface of a fourth lens of the second lens group 200 is a relatively flat aspherical surface, the image-side surface of the fourth lens is aspherical and convex; the object-side surface of the last lens of the second lens group 200 is aspherical and concave, the image-side surface of the last lens is aspherical, the image-side surface is concave near the optical axis, and an inflection point is appeared at a portion of the image-side surface that is far away from the optical axis.

The number of lenses in this embodiment is smaller than that of above embodiments, which can reduce costs, but the wide-angle performance is weaker than that of the previous embodiments.

Fourth Embodiment

Figure 5:
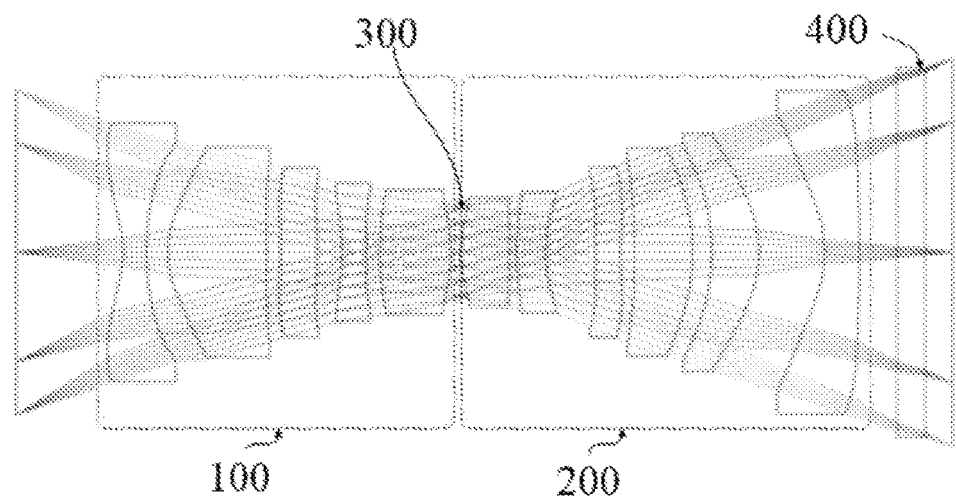
FIG. 5 is a schematic structural diagram of a fourth embodiment of the present disclosure.

The fourth embodiment of the present disclosure is shown in FIG. 5, the first lens group 100 includes five lenses, and the second lens group 200 includes six lenses. The parameters of each surface of the lenses in this embodiment are shown in FIG. 14 and FIG. 15, and the definitions of variables are similar to those described above, and will not be repeated here.

The object-side surface of a first lens of the first lens group 100 in this embodiment is aspherical, the object-side surface is concave near the optical axis, and an inflection point is appeared at a portion of the object-side surface that is far away from the optical axis, and the image-side surface of the first lens is aspherical and concave; the object-side surface of a second lens of the first lens group 100 is aspherical, and is convex near the optical axis, and the image-side surface of the second lens is a relatively flat aspherical concave surface, the second lens as a whole is thicker in the center than the sides; the object-side surface of a third lens of the first lens group 100 is also aspherical and concave, but its concavity is less than that of the object-side surface of the first lens, the image-side surface of the third lens is aspherical and convex; both the object-side surface and the image-side surface of a fourth lens of the first lens group 100 are aspherical and concave; both the object-side surface and the image-side surface of the last lens of the first lens group 100 are aspherical and convex.

The object-side surface and the image-side surface of a first lens of the second lens group 200 in this embodiment are aspherical and convex; the object-side surface of a second lens of the second lens group 200 is aspherical and convex, and the image-side surface of the second lens is aspherical and concave; the center of the object-side surface of a third lens of the second lens group 200 is convex, then a concave surface appears in the off-axis position of the object-side surface of the third lens, the center of the image-side surface of the third lens is concave, and a convex surface appears in the off-axis position of the image-side surface of the third lens; the object-side surface of a fourth lens of the second lens group 200 is a relatively flat aspherical surface, the image-side surface of the fourth lens is aspherical and convex; the object-side surface of a fifth lens of the second lens group 200 is aspherical and concave, the image-side surface of the fifth lens is aspherical and convex; the object-side surface of the last lens of the second lens group 200 is concave near the optical axis, the image-side surface of the last lens is a relatively flat aspherical surface with a slightly convex center.

Figure 6:
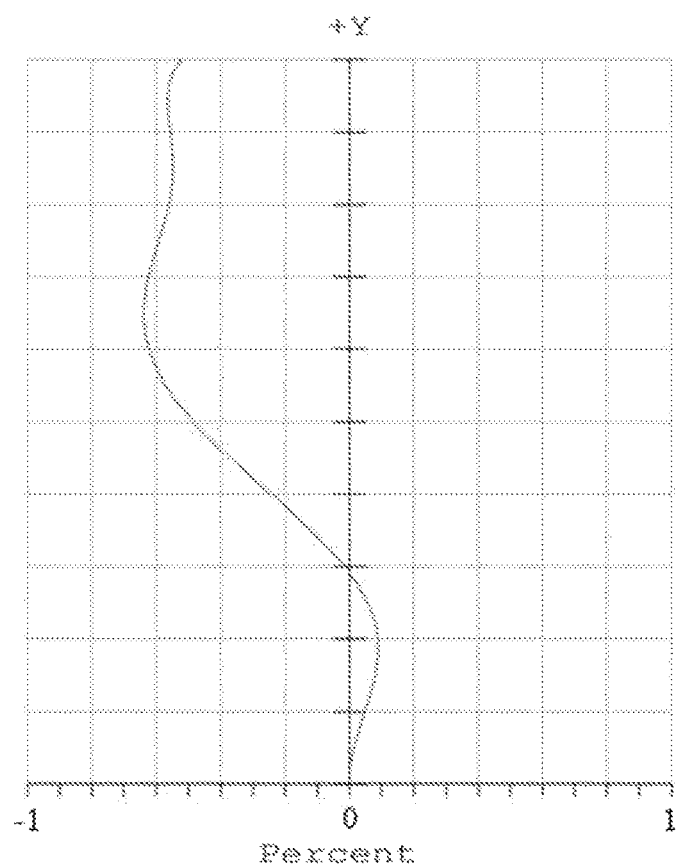
FIG. 6 is a schematic diagram of distortion within a field angle according to the fourth embodiment of the present disclosure.

This embodiment uses more lenses to correct aberrations, which can obtain good wide-angle performance, especially the distortion within the ±30° field angle is less than 0.7% (as shown in FIG. 6), which is excellent for wide-angle imaging.

Fifth Embodiment

Figure 7:
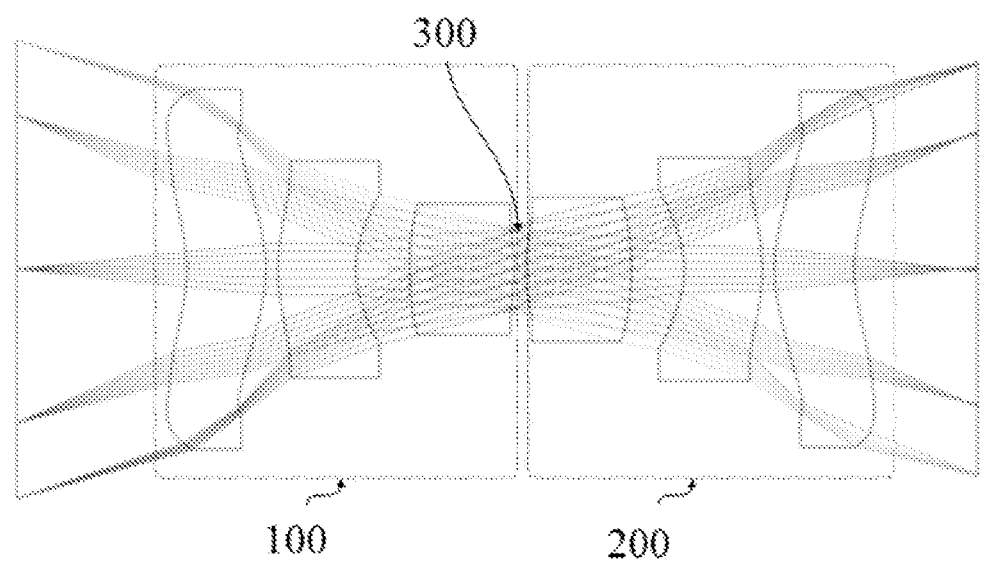
FIG. 7 is a schematic structural diagram of a fifth embodiment of the present disclosure.

The fifth embodiment of the present disclosure is shown in FIG. 7, the first lens group 100 includes three lenses, and the second lens group 200 includes three lenses. The parameters of each surface of the lenses in this embodiment are shown in FIG. 16 and FIG. 17, and the definitions of variables are similar to those described above, and will not be repeated here.

The object-side surface of a first lens of the first lens group 100 in this embodiment is aspherical, the object-side surface is concave near the optical axis, and an inflection point is appeared at a portion of the object-side surface that is far away from the optical axis, and the image-side surface of the first lens is aspherical and convex; the object-side surface of a second lens of the first lens group 100 is aspherical and convex, and the image-side surface of the second lens is aspherical and concave; and both the object-side surface and the image-side surface of a third lens of the first lens group 100 are aspherical and convex.

The object-side surface and the image-side surface of a first lens of the second lens group 200 in this embodiment are aspherical and convex; the object-side surface of a second lens of the second lens group 200 is aspherical and concave, and the image-side surface of the second lens is aspherical and convex; the center of the object-side surface of a third lens of the second lens group 200 is aspherical and convex, and the center of the image-side surface of the third lens is aspherical and concave, and an inflection point is appeared at a portion of the image-side surface that is far away from the optical axis.

This embodiment uses less number of lenses, which is convenient for cost reduction, but the flat-field performance is somewhat reduced.

Those skilled in the art can easily understand that the above embodiments are illustrative, and are not intended to limit the present disclosure. Any modifications, equivalent replacements and improvements made within the spirit and principles of the present disclosure should be included within the protection scope of the present disclosure.

What is claimed is:

1. A miniature imaging lens for close-range imaging, comprising:
    a first lens group;
    an aperture; and
    a second lens group;
    wherein the first lens group, the aperture and the second lens group are sequentially arranged in a direction from an object side to an image side of an optical axis,
    wherein the first lens group and the second lens group have positive focal power, an object-side clear aperture of the first lens group is larger than an image-side clear aperture of the first lens group, and an object-side clear aperture of the second lens group is less than an image-side clear aperture of the second lens group; a focal length of the first lens group is $f_{100} \leq 40$ mm, and a focal length of the second lens group is $f_{200} \leq 20$ mm;
    when in use, a distance $od_{100}$ between an object to be imaged and an object-side principal plane of the first lens group is less than 2 times of the focal length of the first lens group, wherein $od_{100} < 2f_{100}$,
    a distance $id_{200}$ between an image-side principal plane of the second lens group and an image plane of the miniature imaging lens is less than 2 times of the focal length of the second lens group, wherein $id_{200} < 2f_{200}$, and
    an image-side numerical aperture $NA_{img100}$ of the first lens group and an object-side numerical aperture $NA_{obj200}$ of the second lens group satisfy the following condition: $0 < NA_{img100}, NA_{obj200} < 0.05$.

2. The miniature imaging lens for close-range imaging as claimed in claim 1, wherein,
    a distance $sd_{100}$ from the aperture to an edge of the first lens group along an optical axis direction satisfies a formula: $sd_{100} < f_{100}$, and
    a distance $sd_{200}$ from the aperture to an edge of the second lens group along the optical axis direction satisfies a formula: $sd_{200} < f_{200}$.

3. The miniature imaging lens for close-range imaging as claimed in claim 1, wherein,
the second lens group comprises at least three lenses sequentially arranged in the direction from the object side to the image side of the optical axis, the at least three lenses comprises a first lens, . . . , a N–1$^{th}$ lens and a N$^{th}$ lens.

4. The miniature imaging lens for close-range imaging as claimed in claim 3, wherein,
the N–1$^{th}$ lens and the N$^{th}$ lens of the second lens group sequentially arranged in the direction from the object side to the image side of the optical axis are configured as follows:
an image-side surface of the N–1$^{th}$ lens is convex, and at least one of the object-side surface and the image-side surface of the N–1$^{th}$ lens is aspherical; and
both an object-side surface and an image-side surface of the N$^{th}$ lens are concave, and at least one of the object-side surface and the image-side surface of the N$^{th}$ lens is aspherical.

5. The miniature imaging lens for close-range imaging as claimed in claim 3, wherein,
the N–1$^{th}$ lens and the N$^{th}$ lens of the second lens group sequentially arranged in the direction from the object side to the image side of the optical axis are configured as follows:
an image-side surface of the N–1$^{th}$ lens is convex, and at least one of the object-side surface and the image-side surface of the N–1$^{th}$ lens is aspherical; and
an object-side surface of the N$^{th}$ lens is convex, an image-side surface of the N$^{th}$ lens is concave, at least one of the object-side surface and the image-side surface of the N$^{th}$ lens is aspherical, and the N$^{th}$ lens has a region of which thickness is increased as a distance from the optical axis is increased.

6. The miniature imaging lens for close-range imaging as claimed in claim 3, wherein,
the N–1$^{th}$ lens and the N$^{th}$ lens of the second lens group sequentially arranged in the direction from the object side to the image side of the optical axis are configured as follows:
an object-side surface of the N–1$^{th}$ lens is concave, an image-side surface of the N–1$^{th}$ lens is convex, and at least one of the object-side surface and the image-side surface is aspherical; and
an object-side surface of the N$^{th}$ lens is concave, an image-side surface of the N$^{th}$ lens is convex, and at least one of the object-side surface and the image-side surface of the N$^{th}$ lens is aspherical.

7. The miniature imaging lens for close-range imaging as claimed in claim 3, wherein,
the N–1$^{th}$ lens and the N$^{th}$ lens of the second lens group sequentially arranged in the direction from the object side to the image side of the optical axis are configured as follows:
an image-side surface of the N–1$^{th}$ lens is convex, and at least one of the object-side surface and the image-side surface of the N–1$^{th}$ lens is aspherical; and
an object-side surface of the N$^{th}$ lens is convex, an image-side surface of the N$^{th}$ lens is concave, and at least one of the object-side surface and the image-side surface of the N$^{th}$ lens is aspherical, and the N$^{th}$ lens has a region of which thickness is decreased as a distance from the optical axis is increased.

8. The miniature imaging lens for close-range imaging as claimed in claim 4, wherein,
at least one of the object-side surface and the image-side surface of the N$^{th}$ lens has an inflection point.

9. The miniature imaging lens for close-range imaging as claimed in claim 3, wherein,
the second lens group comprises a first lens, a second lens, a third lens, a fourth lens and a fifth lens sequentially arranged in the direction from the object side to the image side of the optical axis,
wherein both an object-side surface and an image-side surface of the first lens are convex;
both an object-side surface and an image-side surface of the second lens are concave;
a center of an object-side surface of the third lens is convex, an off-axis edge of the third lens becomes concave, and a center of an image-side surface of the third lens is concave, an off-axis edge of the third lens becomes convex;
an image-side surface of the fourth lens is convex, and at least one of the object-side surface and the image-side surface of the fourth lens is aspherical; and
both an object-side surface and an image-side surface of the fifth lens are concave, and at least one of the object-side surface and the image-side surface of the fifth lens is aspherical.

10. The miniature imaging lens for close-range imaging as claimed in claim 3, wherein,
the second lens group comprises a first lens, a second lens, a third lens and a fourth lens sequentially arranged in the direction from the object side to the image side of the optical axis,
wherein both an object-side surface and an image-side surface of the first lens are convex;
both an object-side surface and an image-side surface of the second lens are concave, wherein a concavity of the object-side surface of the second lens is greater than that of the image-side surface of the second lens, and the image-side surface of the second lens has an inflection point;
an image-side surface of the third lens is convex, and at least one of the object-side surface and the image-side surface of the third lens is aspherical; and
an object-side surface of the fourth lens is convex, an image-side surface of the fourth lens is concave, at least one of the object-side surface and the image-side surface of the fourth lens is aspherical, and the fourth lens has a region of which thickness is increased as a distance from the optical axis is increased.

11. The miniature imaging lens for close-range imaging as claimed in claim 3, wherein:
the second lens group comprises a first lens, a second lens, a third lens, a fourth lens, a fifth lens and a sixth lens sequentially arranged in the direction from the object side to the image side of the optical axis,
wherein both an object-side surface and an image-side surface of the first lens are convex;
an object-side surface of the second lens is convex, and an image-side surface of the second lens is concave;
a center of an object-side surface of the third lens is convex, an off-axis edge of the third lens becomes concave, and a center of an image-side surface of the third lens is concave, an off-axis edge of the third lens becomes convex;
an object-side surface of the fourth lens is concave, and an image-side surface of the fourth lens is convex;
an object-side surface of the fifth lens is concave, and an image-side surface of the fourth lens is convex, and at least one of the object-side surface and the image-side surface of the fifth lens is aspherical; and an object-side surface of the sixth lens is concave, and an image-side surface of the sixth lens is convex, and at least one of the object-side surface and the image-side surface of the sixth lens is aspherical.

12. The miniature imaging lens for close-range imaging as claimed in claim 3, wherein, the second lens group comprises a first lens, a second lens and a third lens sequentially arranged in the direction from the object side to the image side of the optical axis, wherein both an object-side surface and an image-side surface of the first lens are convex;

an image-side surface of the second lens is convex, and at least one of the object-side surface and the image-side surface of the second lens is aspherical; and an object-side surface of the third lens is convex, an image-side surface of the third lens is concave, at least one of the object-side surface and the image-side surface of the third lens is aspherical, and the third lens has a region of which thickness is decreased as a distance from the optical axis is increased.

13. The miniature imaging lens for close-range imaging as claimed in claim 1, wherein, the first lens group comprises at least three lenses sequentially arranged in the direction from the object side to the image side of the optical axis, the at least three lenses comprises a first lens, a second lens, . . . , and a $N^{th}$ lens.

14. The miniature imaging lens for close-range imaging as claimed in claim 13, wherein, the first lens and the second lens of the first lens group sequentially arranged in the direction from the object side to the image side of the optical axis are configured as follows:

both an object-side surface and an image-side surface of the first lens are concave, and at least one of the object-side surface and the image-side surface of the first lens is aspherical; and an image-side surface of the second lens is convex, and at least one of the object-side surface and the image-side surface of the second lens is aspherical.

15. The miniature imaging lens for close-range imaging as claimed in claim 13, wherein, the first lens and the second lens of the first lens group sequentially arranged in the direction from the object side to the image side of the optical axis are configured as follows:

an object-side surface of the first lens is concave, an image-side surface of the first lens is convex, at least one of the object-side surface and the image-side surface of the first lens is aspherical, and the first lens has a region of which thickness is decreased as a distance from the optical axis is increased; and an object-side surface of the second lens is convex, an image-side surface of the second lens is concave, and at least one of the object-side surface and the image-side surface of the second lens is aspherical.

16. The miniature imaging lens for close-range imaging as claimed in claim 13, wherein, the first lens and the second lens of the first lens group sequentially arranged in the direction from the object side to the image side of the optical axis are configured as follows:

both an object-side surface and an image-side surface of the first lens are concave, and at least one of the object-side surface and the image-side surface of the first lens is aspherical; and an object-side surface of the second lens is convex, and at least one of the object-side surface and the image-side surface of the second lens is aspherical.

17. The miniature imaging lens for close-range imaging according to claim 14, wherein, at least one of the object-side surface and the image-side surface of the first lens has an inflection point.

18. The miniature imaging lens for close-range imaging as claimed in claim 13, wherein, the first lens group comprises a first lens, a second lens, a third lens and a fourth lens sequentially arranged in the direction from the object side to the image side of the optical axis, wherein both an object-side surface and an image-side surface of the first lens are concave, and at least one of the object-side surface and the image-side surface of the first lens is aspherical;

an object-side surface of the second lens is convex, an image-side surface of the second lens is concave, at least one of the object-side surface and the image-side surface of the second lens is aspherical, and the second lens has a region of which thickness is decreased as a distance from the optical axis is increased;

an object-side surface of the third lens is concave, but a concavity of the object-side surface of the third lens is less than that of the object-side surface of the first lens, and an image-side surface of the third lens is concave; and both an object-side surface and an image-side surface of the fourth lens are convex.

19. The miniature imaging lens for close-range imaging as claimed in claim 13, wherein, the first lens group comprises a first lens, a second lens and a third lens sequentially arranged in the direction from the object side to the image side of the optical axis, wherein an object-side surface of the first lens is concave, an image-side surface of the first lens is convex, at least one of the object-side surface and the image-side surface of the first lens is aspherical, and the first lens has a region of which thickness is decreased as a distance from the optical axis is increased;

an object-side surface of the second lens is convex, an image-side surface of the second lens is concave, and at least one of the object-side surface and the image-side surface of the second lens is aspherical; and both an object-side surface and an image-side surface of the third lens are convex.

20. The miniature imaging lens for close-range imaging as claimed in claim 13, wherein, the first lens group comprises a first lens, a second lens, a third lens, a fourth lens and a fifth lens sequentially arranged in the direction from the object side to the image side of the optical axis, wherein both an object-side surface and an image-side surface of the first lens are concave, and at least one of the object-side surface and the image-side surface of the first lens is aspherical;

an object-side surface of the second lens is convex, an image-side surface of the second lens is concave, at least one of the object-side surface and the image-side surface of the second lens is aspherical, and the second lens has a region of which thickness is decreased as a distance from the optical axis is increased;

an object-side surface of the third lens is concave, but the concavity of the object-side surface of the third lens is less than that of the object-side surface of the first lens, and an image-side surface of the third lens is convex;

both an object-side surface and an image-side surface of the fourth lens are concave; and both an object-side surface and an image-side surface of the fifth lens are convex.

21. The miniature imaging lens for close-range imaging as claimed in claim 1, wherein, the miniature imaging lens for close-range imaging is a miniature imaging lens for portable electronic products.

* * * * *